July 20, 1937.  G. BOWMAN ET AL  2,087,718
HYDRAULIC JACK
Filed Sept. 27, 1935
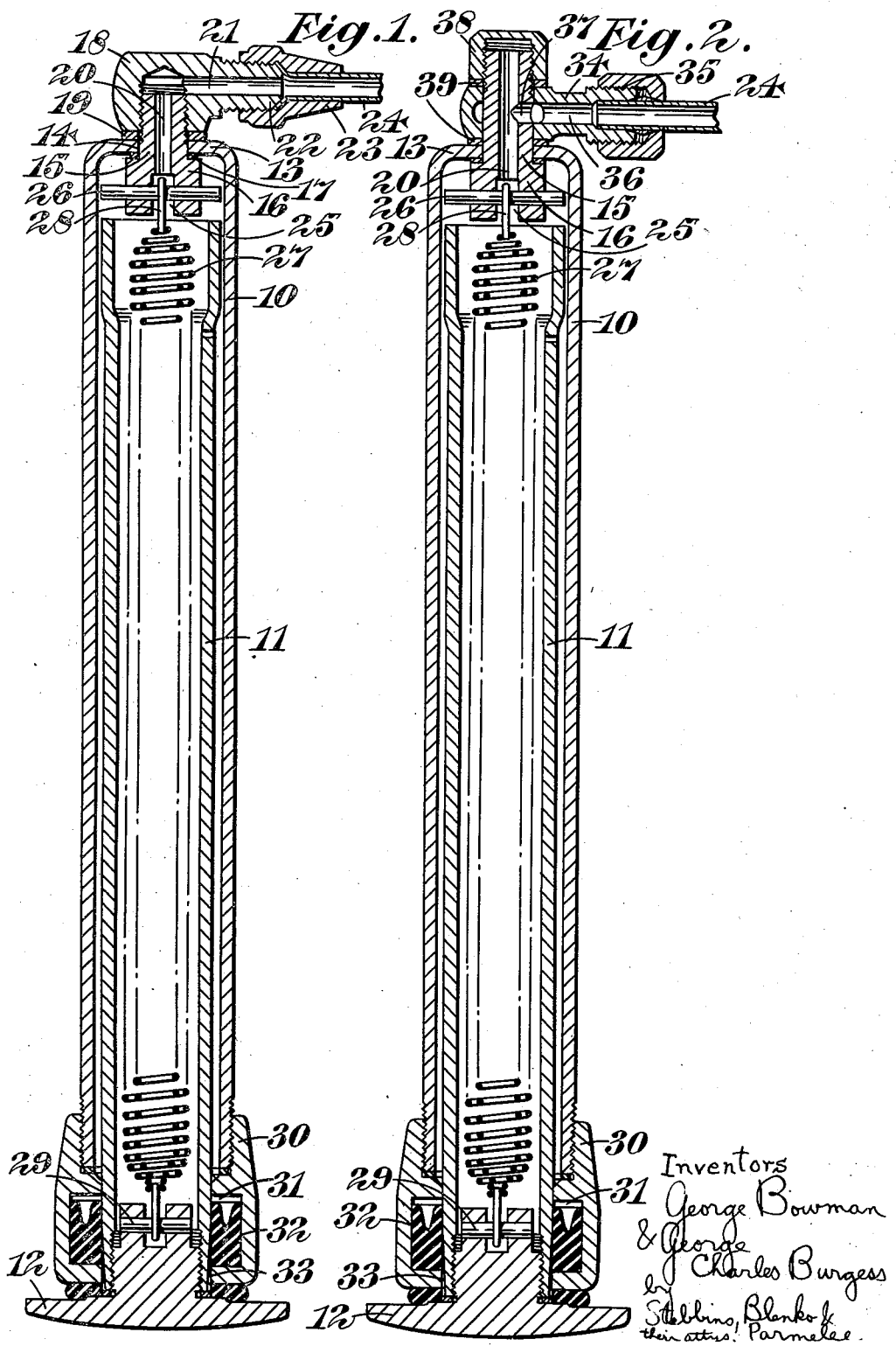
Inventors
George Bowman
& George Charles Burgess
by Stebbins, Blenko &
their attys. Parmelee.

Patented July 20, 1937

2,087,718

UNITED STATES PATENT OFFICE 2,087,718

HYDRAULIC JACK

George Bowman, Cricklewood, London, and George Charles Burgess, Wembley, England, assignors to S. Smith & Sons (Motor Accessories) Limited, London, England, a British company Application September 27, 1935, Serial No. 42,551 In Great Britain October 4, 1934

7 Claims. (Cl. 121—46)

The invention relates to hydraulic jacks of the kind having telescopic members at least one of which is tubular and has a conduit through the outer closed end for the passage of operating-fluid to the interior in order to extend the jack. A tension spring is also provided between the outer ends of the two tubular members to retract the jack from the extended position when the fluid pressure is released.

The object of the present invention is to provide a more simple and improved construction of hydraulic jack of the kind hereinafter referred to and according to a feature of the invention there is provided a bolt mounted within the outer end of the tubular telescopic member which bolt has a throughway passage for the fluid and also constitutes an anchor for one end of the retracting spring.

A further feature of the invention consists in forming the bolt with a flange bearing upon the inner side of the tubular member and securing the bolt in position with a fluid-tight joint by means of a retaining member on the bolt at the exterior of the tubular member, which retaining member also constitutes a pipe connection for the supply of operating-fluid to the jack. In an alternative construction the bolt is formed with an outer extension constituting one part of a swivel pipe-joint.

A further feature of the invention consists in the provision of means for providing a fluid-tight joint between the telescopic members wherein the outer tubular member is provided at its inner end with an interior annular groove permanently closed on the inner tubular member, into which groove a resilient packing ring is sprung into position during the assembly of the telescopic members.

In one construction the outer tubular member comprises a sleeve on the inner end formed in one piece and provided with the aforesaid permanent groove.

A specific embodiment of the invention is shown, by way of example, in the accompanying drawing in which:—

Figure 1 is a cross-section of one form of the jack, and

Figure 2 is a similar view of a modification.

Referring to Figure 1 of the drawing the jack comprises an outer tubular member 10 and an inner tubular member 11, the outer end of which latter is closed by means of a shoe 12. The outer end of the tubular member 10 is turned over as indicated at 13 to provide a central hole 14 into which there is fitted a bolt or plug 15 having an enlarged or flanged part 16 bearing through an intermediate washer 17 on the inner side of tube 10.

The outer part of the plug 15 is screw-threaded to receive a fixing nut 18 screw-threaded thereon and bearing through a washer 19 against the outer side of the tube 10 in order to hold the plug 15 in position with the fluid-tight joint in the end of the tube 10.

The plug 15 is provided with a fluid-passage 20 communicating with a fluid-passage 21 in the nut 18 and this nut also comprises a spigot portion 22 of a pipe-union 23 for the attachment of a supply-pipe 24.

The inner end of the plug 15 is provided with a diametrical recess 25 and at right angles to this recess there is provided a cross-pin 26 to form an anchorage for a retracting spring 27 connected thereto by means of a hook 28. The other end of the spring 27 is similarly connected to an anchorage 29 on the shoe 12.

Thus, the provision of an anchorage for the spring 27 and the entry for the operating-fluid are both served by the plug and simple means of fixing are provided by the use of the nut 18 arranged also for connection to the supply-pipe 24 leading to the jack at right angles thereto as is usual in jacking systems employed on vehicles.

In the modification shown in Figure 2, the plug 15 is extended and has mounted thereon a rotatable pipe-connection 34 connected by means of a union 35 with the feed-pipe 24. This pipe-connection thus forms with the plug 15 a swivel-joint and has a fluid-passage 36 extending around the plug and communicating with the fluid-passage 20 therein by means of a transverse hole 37. The outer end of the plug is provided with a screw-threaded cap 38 by means of which the plug is retained in position, and the pipe-connection 34 being also held between packing washers 39 in order to render the joint fluid-tight.

In order to provide the necessary fluid-tight joint between the outer and inner tubular members 10 and 11, there is provided on the inner end of the outer tube 10 a one-piece sleeve 30 formed with an annular groove 31 having permanent side walls, that is to say, side walls which are relatively immovable, which groove overlies the outer surface of the tubular member 11. In this groove there is provided a resilient packing ring 32, e. g. of rubber, which is sprung into position in the groove during the assembly of the tubular members. The inner tube 11 is preferably chamfered at 33 to facilitate the fitting of the packing ring. The packing ring 32 is preferably somewhat of U-shape in cross-section and one or more recesses may be provided in the sleeve to ensure the passage of fluid to the space between the two limbs of the packing ring in order to obtain an efficient seal on the inner tube 11. By this construction the usual retaining ring screw-threaded in the sleeve to hold the packing ring in position and also the inner locating ring usually provided between the limbs of the packing ring are both dispensed with.

We claim:—

1. A hydraulic jack comprising a plurality of relatively movable telescopic members of which at least the outer one is tubular, said tubular member having a hole in the wall thereof, a bolt extending through said hole, which bolt has a throughway passage for operating liquid and also spring anchoring means, a retaining nut on said bolt at the exterior of the tubular member and securing the bolt to the said wall, which retaining nut constitutes a pipe-connection in communication with the throughway passage in the bolt, and spring retracting means attached to said anchoring means and also operatively connected to an inner one of said telescopic members.

2. A hydraulic jack comprising a plurality of relatively movable telescopic members of which the outer one is tubular, which tubular member is turned over at its end to form an end wall with a central hole, a bolt extending through said hole which bolt is formed with a head bearing on the inner side of said end wall, a retaining nut on said bolt at the exterior of said end wall securing the bolt to the end wall which bolt has a throughway passage for operating liquid, said nut constituting a pipe-connection in communication with said throughway passage in the bolt, spring anchoring means on said bolt and spring retracting means attached to said anchoring means and also operatively connected to the inner one of said telescopic members.

3. A hydraulic jack comprising a plurality of relatively movable telescopic members of which at least the outer one is tubular, said tubular member having a hole in a wall thereof, a bolt extending through said hole and having a throughway passage for operating liquid and also spring anchoring means, a pipe-connection swivel mounted on said bolt at the exterior of said tubular member and in communication with said throughway passage, and spring retracting means attached to said anchoring means and operatively connected to an inner one of said telescopic members.

4. A hydraulic jack comprising a plurality of relatively movable telescopic members of which the outer one is tubular, which tubular member is turned over at its end to form an end wall with a central hole, a bolt extending through said hole, said bolt having a throughway passage and also spring anchoring means, a pipe-connection swivel mounted on said bolt at the exterior of said tubular member and in communication with said throughway passage, and spring retracting means attached to said anchoring means and operatively connected to the inner one of said telescopic members.

5. A hydraulic jack comprising a plurality of relatively movable telescopic members of which the outer one is tubular, which tubular member is turned over at its end to form an end wall with a hole therein, a bolt extending through said hole and provided with a head bearing upon the inner side of said end wall, a retaining nut on the said bolt at the exterior of the tubular member and securing the bolt to said end wall, which bolt has a throughway passage for operating liquid and also spring anchoring means, and spring retracting means attached to said anchoring means and also operatively connected to an inner one of said telescopic members.

6. A hydraulic jack comprising a plurality of relatively movable telescopic members of which the outer one is tubular, which tubular member is turned over at its end to form an end wall with a hole therein, a bolt extending through said hole and formed with a head bearing on the inner side of the tubular member, a retaining nut on the said bolt at the exterior of the tubular member and securing the bolt to said end wall, said bolt having a throughway passage for operating liquid and being formed with a spring anchorage comprising a cross-pin bridging a recess in the head of said bolt, and spring retracting means anchored to said cross-pin and also operatively connected to the inner one of said telescopic members.

7. A hydraulic jack comprising inner and outer relatively movable telescopic members of which the outer one is tubular, which tubular member is turned over at its end to form an end wall with a hole therein, a bolt extending through said hole, and provided with a head bearing upon the inner side of said end wall, a retaining nut on the said bolt at the exterior of the tubular member and securing the bolt to said end wall, which bolt has a throughway passage for operating liquid and also spring anchoring means, spring retracting means attached to said anchoring means and also operatively connected to the inner telescopic member, said outer tubular member being provided near one end with an internal annular groove comprising integral side walls and a resilient packing ring sprung into position in said groove during the assembly of said telescopic members, and bearing upon the inner telescopic member.

GEORGE BOWMAN.
GEORGE CHARLES BURGESS.